United States Patent
Wolfe

(10) Patent No.: US 6,420,846 B1
(45) Date of Patent: Jul. 16, 2002

(54) POWER DRIVE UNIT WITH STALL SENSOR

(75) Inventor: Robert M. Wolfe, Mission Viejo, CA (US)

(73) Assignee: Lucas Western Inc., Jamestown, ND (US)

( * ) Notice: Subject to any disclaimer, the term of this patent is extended or adjusted under 35 U.S.C. 154(b) by 0 days.

(21) Appl. No.: 09/595,572

(22) Filed: Jun. 14, 2000

Related U.S. Application Data

(60) Provisional application No. 60/160,266, filed on Oct. 19, 1999.

(51) Int. Cl.[7] .............................. B64C 1/22; B65G 13/06; G01P 3/48
(52) U.S. Cl. .................... 318/463; 244/137.1; 198/780; 324/174
(58) Field of Search ..................... 244/137.1; 198/780, 198/781.01–781.06, 781.1; 318/461, 463; 324/160, 166, 167, 173, 174, 178, 179

(56) References Cited

U.S. PATENT DOCUMENTS

| | | | | |
|---|---|---|---|---|
| 3,978,975 A | | 9/1976 | Herbes et al. ............... 198/782 |
| 4,163,999 A | | 8/1979 | Eaton et al. .................. 361/23 |
| 4,180,150 A | * | 12/1979 | Moore | |
| 4,819,782 A | * | 4/1989 | Fenner | |
| 5,048,672 A | * | 9/1991 | Sundseth | |
| 5,183,150 A | * | 2/1993 | Chary et al. | |
| 5,203,446 A | * | 4/1993 | Ufland | |
| 5,215,184 A | * | 6/1993 | Huber | |
| 5,267,709 A | * | 12/1993 | Koharcheck et al. | |
| 5,526,923 A | * | 6/1996 | Johansson et al. | |
| 5,547,069 A | * | 8/1996 | Pritchard | |
| 5,568,858 A | | 10/1996 | Thompson ............. 198/781.06 |
| 5,661,384 A | | 8/1997 | Glibbery ..................... 318/471 |
| 6,244,427 B1 | * | 6/2001 | Syverson ..................... 198/788 |

\* cited by examiner

*Primary Examiner*—Bentsu Ro
(74) *Attorney, Agent, or Firm*—Christie, Parker & Hale, LLP

(57) ABSTRACT

A power drive unit having drive roller elements that transport cargo and a sensor that detects motion of the cargo, e.g., the speed at which the cargo is transported, where the sensor operates substantially independently of the motion of the-drive roller elements. Specifically, the power drive unit comprises a motor, an output shaft driven by a motor, at least one drive roller element fixedly mounted on the output shaft, the drive roller element thereby driven by the motor, a sensor frictionally coupled to the output shaft conditionally permitting relative rotation between the sensor and the output shaft, and a motion detector that detects motion of the sensor. Associated electronics are configured to remove power from the motor driven roller elements where cargo is jammed or parked upon them, thereby increasing the useful lifetimes of the motor and the drive roller elements of the power drive unit.

16 Claims, 3 Drawing Sheets

POWER DRIVE UNIT WITH STALL SENSOR

This application claims the benefit of U.S. Provisional Application No. 60/160,266, filed on Oct. 19, 1999.

BACKGROUND OF THE INVENTION

1. Field of the Invention

The present invention relates to a power drive unit for transporting cargo, and particularly to the transportation of cargo within an aircraft.

2. Description of the Prior Art

A large variety of motorized systems for moving cargo are known. Motor driven rollers are employed in some such systems. Cargo and passenger planes in particular often employ series of motor driven power drive units (PDUs) to propel cargo containers and pallets, or unit load devices within the aircraft cargo compartment quickly and efficiently. This configuration can allow for the transportation of cargo from the external loader to the interior of the airplane by a single operator controlling the PDUs.

Cargo within an airplane cargo deck is typically supported by a system of freely rotating floor-mounted conveyance rollers (see FIGS. 1 and 2). Sets or banks of PDUs can be simultaneously elevated from beneath the cargo deck to a level just above the conveyance rollers. Each PDU is a separate electro-mechanical actuator which includes one or more rubber coated wheels or drive rollers. The drive rollers of the elevated PDUs contact and move cargo above the conveyance rollers in the commanded direction upon energization. The movement of cargo depends on the coefficient of friction between the PDU drive rollers and the bottom surface of the cargo, as well as the lifting force generated by the PDU lift mechanism. When the PDUs are deenergized, roller rotation ceases and the cargo stops moving.

Several sets of PDUs can be arranged along a common path of conveyance, and each set can be operated separately, thereby allowing for the. transfer of multiple pieces of cargo. An operator supervising the transportation of cargo into the cargo deck area can guide cargo by means of a joys tick and an on/off switch or similar controls.

PDUs can be damaged when they continue to operate beneath immobilized cargo, a condition known as scrubbing, which can occur when cargo is too heavy or has come upon an obstruction such as a wall within the cargo compartment. Scrubbing can quickly wear away the rubber coating on the rollers necessitating their replacement and can result in damage to the PDU motor.

Cargo container stall sensors integrated within a PDU are used to sense a stalled container and to remove power to the PDU after a predetermined delay to avoid PDU damage. PDUs typically have a manual de-select switch for removing power to the PDUs when a stall condition is sensed. Unfortunately, this de-select switch is often not used properly by operators, who are focused on loading cargo rather than protecting PDUs. Thus, damage to PD Us when scrubbing conditions occur is a common problem.

Problems associated with scrubbing are addressed in U.S. Pat. No. 5,661,384. Experiments have shown that when the temperature of the PDU motor surpasses a certain level, it is indicative of a stalled or jammed condition. The '384 patent describes a PDU that determines when cargo is jammed by monitoring the temperature of the motor and removing power to the unit when a temperature limit is exceeded. This arrangement, while a significant advantage, is subject to error during, for example, extreme environmental conditions.

Other known stall sensors employ protruding mechanical wheels which are depressed when a payload is positioned over a PDU. This type of system can be a burden to maintain.

Moreover, the extended wheels are not protected from oddly shaped cargo and are readily susceptible to damage.

U.S. Pat. No. 5,568,858 describes a system for detecting a stall condition that employs a sensor driven by the movement of the cargo itself. When overlying cargo is jammed, the sensor does not move, and this absence of motion is sensed electronically. Power to the PDU is then interrupted. This solution is not entirely satisfactory because of the unevenness of the bottom surface of the cargo. In other words, variations in the cargo surface can cause erroneous stall signals. Complex additional sensors may be required to overcome this problem.

In view of the above, it should be appreciated that there is a continuing need for a cargo stall sensor for use with a PDU with improved reliability, and durability. There is also a need for a PDU having a cargo stall sensor that is relatively inexpensive to manufacture and easy to maintain. The present invention satisfies these and other needs and provides further advantages that will be apparent from the description below.

SUMMARY OF THE INVENTION

The present invention is embodied in a PDU having drive roller elements that transport cargo and a sensor that effectively detects movement or immobilization of the cargo. Thus, the invention is configured to remove power from the motor driven roller elements when cargo is jammed or otherwise immobilized, thereby preventing damage to the motor and the drive roller elements of the PDU.

The PDU comprises a motor, an output shaft driven by the motor, at least one drive roller element mounted on the output shaft so that the drive roller element is driven through the shaft by the motor, a sensor also driven through the output shaft by a drag device that conditionally permits relative rotation between the sensor and the output shaft, and a motion detector that detects rotation of the sensor.

In one embodiment of this invention, the stall sensor is mounted on the output shaft. The sensor is configured as a wheel, that can carry one or more magnets. When there is no load (cargo) positioned over the PDU, the stall sensor, coupled through the drag device to the drive roller element, rotates at the same speed as the drive roller element. A motion detector, such as a Hall effect sensor, senses the frequency with which the magnet passes and a signal corresponding to that frequency is sent to a logic circuit which causes power to be removed from the PDU when the frequency falls below a predetermined value. This will occur when cargo in contact with the sensor becomes jammed or stopped, causing the frictional forces at the cargo surface to be greater than that at the drag device, thereby stopping sensor rotation.

In a second embodiment of the invention, the stall sensor and at least one of the drive roller elements are frictional connected to each other such that the friction at a drive roller element contact face drives the stall sensor when the friction at the stall sensor is overcome by the friction at the cargo surface. When the frictional force at the cargo surface becomes greater than at the drive roller element contact face because the cargo is jammed, a motion detector detects the relative change in motion between the stall sensor and the drive roller element and sends a signal to a logic circuit and, if a predetermined value is exceeded, the power to the motor is removed.

The invention can be embodied in an airplane with a cargo transportation system comprising a hull with a floor with an array of conveyance rollers mounted on the floor and cargo power drive units for moving cargo on the conveyance rollers. The cargo power drive unit comprises a translatable frame for retracting and extending the power drive unit into a cargo plane of conveyance, a motor mounted on the frame, an output shaft driven by the motor, at least one drive roller mounted on the shaft and coupled thereto to be driven by the motor to move cargo positioned above the drive roller in a plane of conveyance, a rotatable generally circular wheel frictionally coupled to the output shaft by a drag device for rotation therewith, a plurality of magnets mounted on the wheel, a Hall effect sensor, which can be mounted on the power drive unit to detect the motion of the magnets, and a logic circuit connected to the Hall effect sensor and the motor that removes power to the motor when a signal below a predetermined level is received from the Hall effect sensor.

Other features and advantages of the present invention will become apparent from the following description of the preferred embodiments, taken in conjunction with the accompanying drawings, which illustrate, by way of example, the principles of the invention. The detailed description of the preferred embodiments, set out below to enable one to build and use one particular implementation of the invention, is not intended to limit the claims, but to serve as a particular example thereof.

DESCRIPTION OF THE PREFERRED EMBODIMENTS

Figure 1:
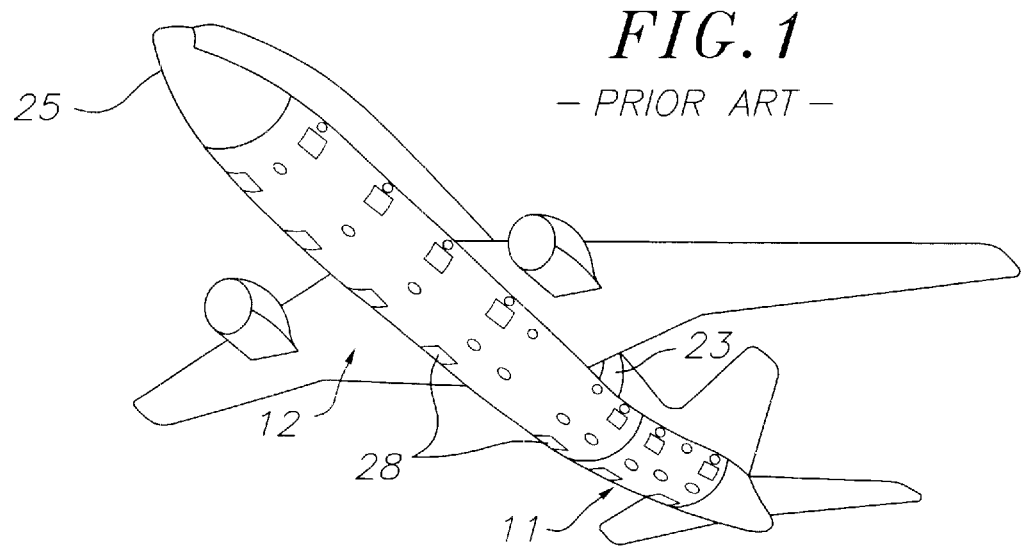
FIG. 1 is an illustration of the underside of an airplane.

A generally H-shaped conveyance surface 26 forms the lower deck of an aircraft (see FIG. 2), adjacent a cargo bay loading door 23 (see FIG. 1). It is emphasized, however, that there are many aircraft cargo deck configurations to which the present invention can be applied. For example, some aircraft, particularly those configured primarily for the transportation of cargo without passengers, have the upper passenger deck removed and an additional larger cargo deck installed. Other aircraft may have three or more parallel longitudinal tracks rather than the H-shape shown in FIG. 2.

The cargo surface includes a system of freely rotating conveyance rollers 27 mounted in the cargo deck (see FIGS. 1 and 2) to define the conveyance plane. Cargo loaded onto the aircraft cargo deck can be moved manually throughout the cargo bay upon the freely rotating conveyance rollers. However, it is desirable to electro-mechanically propel the loads with minimal or no manual assistance. To this end, the H-shaped cargo surface includes a number of PDUs 28, that provide a mechanism upon which cargo is propelled over the conveyance rollers 27. Each PDU typically includes a drive roller element which can be raised from a lowered position beneath the cargo deck to an elevated position. In the elevated position, the drive roller element contacts and drives the overlying cargo that rides on the conveyance rollers.

Figure 2:
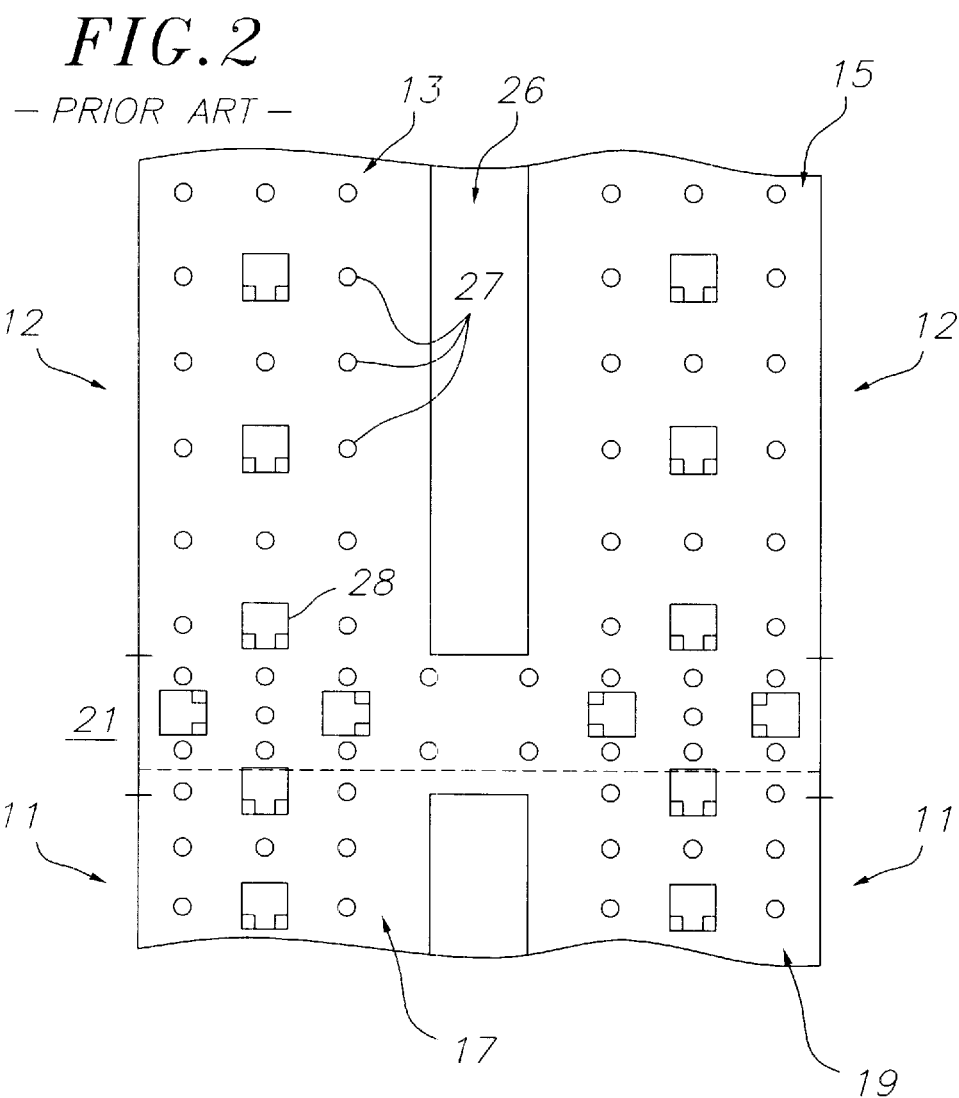
FIG. 2 shows a portion of the cargo bay of the airplane of FIG. 1.

The exemplary H-shaped conveyance surface 26 includes a left track along which cargo is to be stowed in parallel columns during flight (see FIG. 2). As the aircraft fuselage narrows at the aircraft's tail, the cargo deck is also separated into a tail section 11 and a main section 12, with the tail section being tilted slightly upwardly. Thus, the left and right tracks are divided into four sections, two forward sections 13 and 15 and two aft sections 17 and 19. In addition to the four sections just described, there is an additional path 21 between both tracks at the cargo door 23 (see FIG. 1), at the junction of the tail and main sections 11 and 12. This path is used to move cargo into and out of the aircraft, and also to transfer cargo between the left and right storage tracks.

A human operator manipulates the controls to selectively energize the PDUs 28 in each of the five aforementioned sections 13, 15, 17, 19 and 21. Typically, these controls are mounted in an operator interface unit connected to a PDU power relay box by a cable. The control elements may be mounted on a wall or other structure within the cargo bay or may be in a hand held pendant. These controls will typically have an on/off switch and a joy stick which, depending on the direction pushed, will energize a set of PDUs 28, causing groups of drive roller elements to be elevated and rotated in one of two possible directions. A section of PDUs will remain energized as long as the joy stick is held in a corresponding position. When the joy stick is released, the set of PDUs selected is de-energized and the drive roller elements are returned to their retracted position below the plane of the conveyance rollers 27, or brakes are applied to hold the cargo containers in place. Control systems of this type as known to those skilled in the art are not described in further detail here.

Figure 3A:
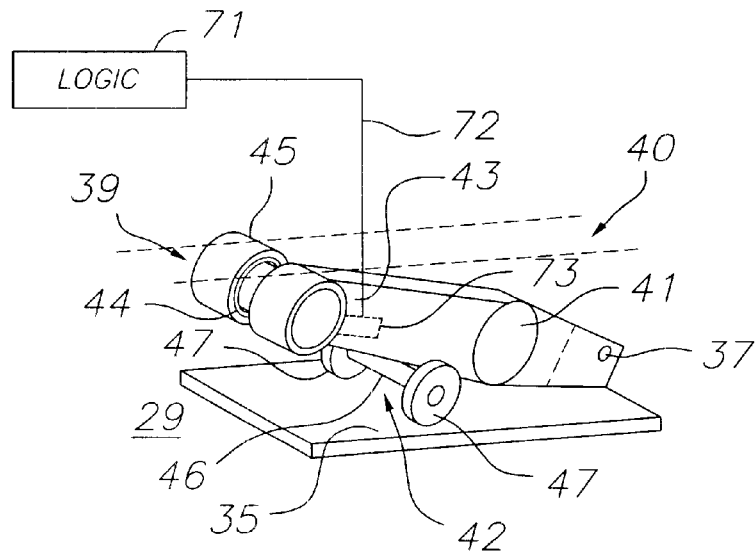
FIG. 3A is an isometric view of a PDU according to the present invention for moving cargo in the cargo bay of FIG. 2.

An exemplary PDU 29 of the present invention (shown in FIG. 3A) includes a stationary base, which is mounted to the aircraft 25 below the conveyance plane 40 and a translatable frame 37, which is pivotable on an axle 38 such that a swinging end 39 can be elevated above the plane of conveyance 40. PDUs 29 are typically low profile rectangular arrays with a frame that can be easily mounted within and removed from the aircraft cargo deck. The translatable frame supports a motor 41, reduction gears 43, a stall sensor 44, drive roller elements 45 for contacting and propelling cargo, and a cam element 47 for moving the frame toward the plane of conveyance 40. Also mounted on the translatable frame 37 is a motion detector 73, which is in electronic communication via a wire 72 with a logic circuit 71. The logic circuit 71 may be mounted elsewhere, depending on design preference.

When energized, the PDU motor 41 applies torque to the reduction gears 43. The torque provided to the drive roller elements 45 by the reduction gearing 43 is thus applied to a rockable shaft 46 on which cam element 47 rides. A torque control device 42 is used to transmit a portion of the motor torque to the lift mechanism. As a result, a fraction of the torque from the motor is passed almost entirely to the rockable shaft 46, causing the cam element 47 to rotate, and to translate the frame 37 toward the conveyance plane 40. This elevating movement of the frame 37 is explained in detail in U.S. Pat. No. 5,661,384, which is incorporated herein by reference. The PDUs 29 are mounted close enough to the plane of conveyance 40 so that only a short stroke is needed to bring the stall sensor 44 and the drive roller element 45 into a position where they can contact the underside of the cargo.

Once drive roller element 45 has been elevated to contact heavy cargo, or the swinging end 39 has reached the limit of its travel, the drive roller elements rotate in the commanded direction. As explained below, the torque from the motor, which also drives the drive roller element 45, is imparted to a stall sensor 44 by a drag device 65 (see FIG. 4) allowing the sensor to rotate with the drive roller element when the drive roller element is not in contact with cargo or when the cargo is moving. Because of the gear configuration, the drive roller element is adapted to rotate either clockwise or counter-clockwise about its central axis, depending upon the direction of motor shaft 48 rotation (see FIG. 5).

When the motor 41 is in operation and its output direction is reversed, the cam element 47 rotates and translates frame 37 so that the PDU 29 is lowered from the plane of conveyance 40 to a retracted rest position. The reduction gears 43 are then ready for reverse motion and some of the torque from the motor is passed to the rockable shaft 46, causing the cam element 47 to rotate, and move the frame 37 toward the conveyance plane.

Figure 4:
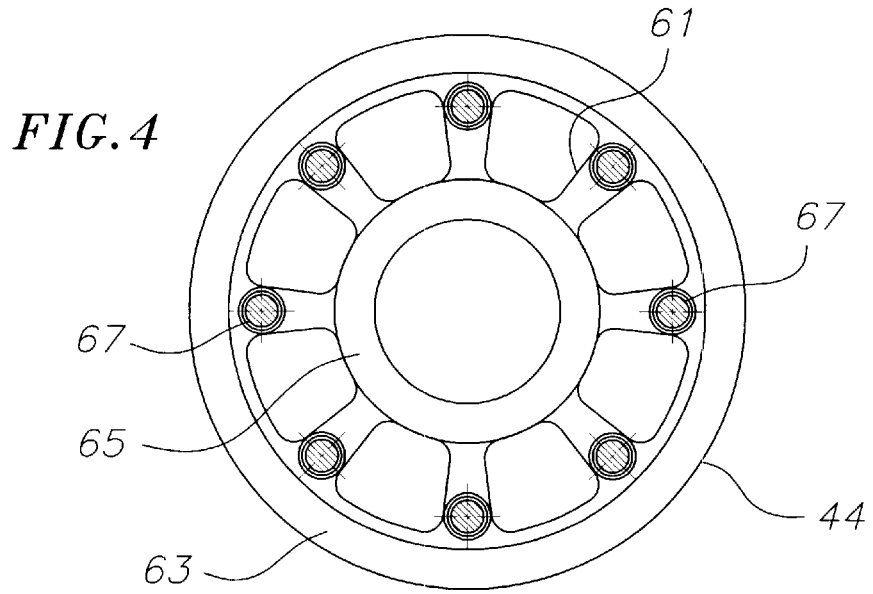
FIG. 4 shows an exemplary stall sensor incorporated into the PDU of FIGS. 3A and 3B.
Figure 5:
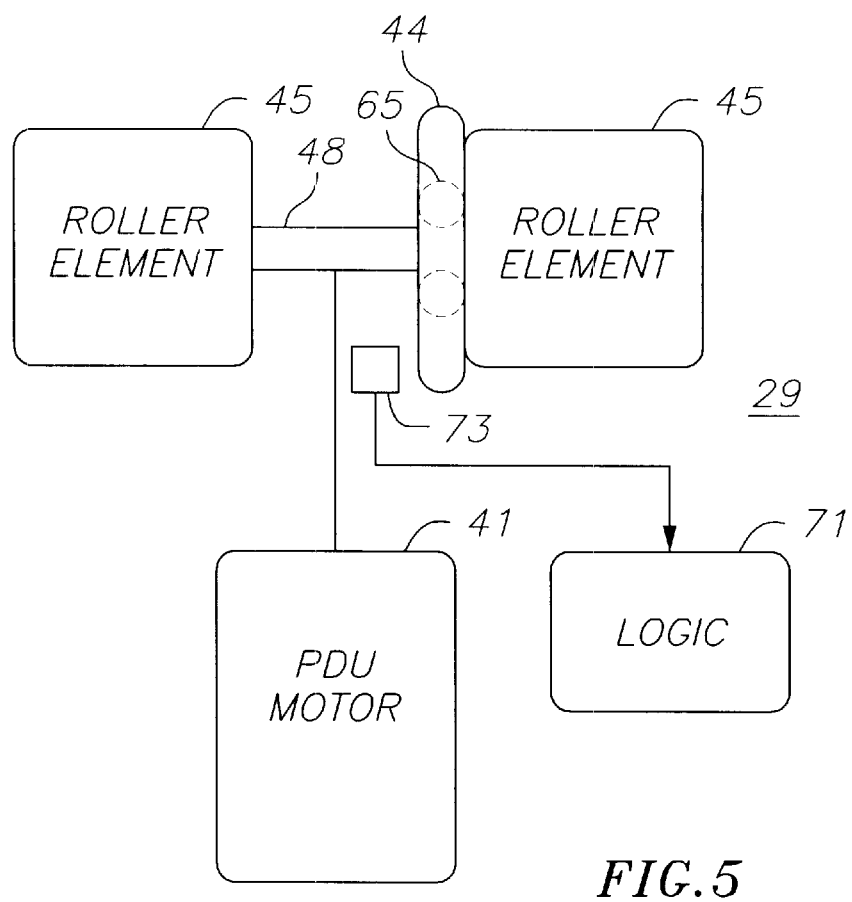
FIG. 5 is a block diagram of the PDU of FIGS. 3A and 3B.

The exemplary stall sensor 44 is in the form of a spoked wheel 61, the diameter of which is slightly larger than the drive roller element 45 (see FIG. 4). An outer surface of the spoked wheel is formed by a layer of a material with a relatively high coefficient of friction. Optionally, the outer surface may be formed by an elastomeric O-ring 63 disposed within a groove on the outer circumference of the spoked wheel 61. A soft deformable component, such as an elastomeric O-ring or a tire, is preferable because it absorbs the impact of cargo placed on the sensor and it compensates for varying drive roller element sizes resulting from manufacturing variances or wear.

Forming an inner circumferential surface of the sensor wheel 44 is a drag device. This device may be a second elastomeric O-ring 65 held within an inner groove along the inner circumference of the wheel 61 or other device that is of a shape, material and dimension for generating a predetermined frictional drag between the sensor wheel and the motor output shaft 48.

When the PDU motor 41 is activated, the drive roller element 45 is driven directly by the motor output shaft 48, while the drag device 65 transmits a predetermined frictional drive force between the stall sensor 44 and the output shaft, resulting in the stall sensor being driven at substantially the same rotational speed as the drive roller element. A motion detector 73 housed on the PDU 29 detects any relative rotational motion between the stall sensor 44 and the drive roller element 45. A plurality of magnets 67 are equally spaced along a side surface of the sensor wheel 44. Adjacent to the stall sensor 44 and mounted on the frame 37 is the motion detector 73, preferably a Hall effect sensor. When the stall sensor is in motion, the magnets rotate about the motor output shaft 48. Preferably, the motion detector is mounted on the translatable frame aligned with the path of the magnets so as to sense a magnet passing in front of it. A signal corresponding to the rate at which magnets pass in front of the Hall effect sensor is sent to a logic circuit 71. From this signal, the relative distance traveled, acceleration or velocity may be computed.

The PDU motor 41 is attached to an output shaft 48, which in turn is coupled to two drive roller elements 45. The motor 41, when activated, rotates the output shaft 48 which rotates the drive roller elements 45. Also attached to the shaft 48 is a stall sensor 44 (shown adjacent to a drive roller element for illustration only) A drag device 65 forms part of the stall sensor 44 and couples the sensor to the output shaft 48 to conditionally impart rotational motion to the sensor (see FIG. 5).

In operating proximity to the sensor 44 is a motion detector 73 that detects the speed of rotation of the sensor. The motion detector in turn is connected to logic circuit 71 that may be programmed to limit the operation of the PDU 29 if one of several predetermined conditions are detected. These conditions may be transmitted to a monitor or otherwise displayed to the operator of the PDU.

In operation, the PDU 29 is activated and the output shaft 48 drives the drive roller element 45 and the stall sensor 44. When the drive roller elements 45 are in contact with cargo, the cargo is driven by the drive roller elements, while the stall sensor 44 also contacts the cargo and continues to be driven by the motor output shaft 48. The cargo may stop moving in the commanded direction if: (1) the drive command is removed (the PDU is deenergized); (2) the cargo encounters an abutment within the aircraft; (3) the cargo above the PDU contacts other cargo that is stationary; or (4) the cargo stalls due to a jam condition. If any of the latter three conditions occurs, the drive roller elements 45 continue to rotate against the bottom of the cargo (scrub), but the stall sensor stops rotating because the frictional force at the cargo surface, overcomes the torque provided by the drag device 65.

When cargo stops moving and the stall sensor 44 consequently stops rotating, the rotational velocity of the stall sensor falls below a predetermined value which is detected by the motion detector 73. The system logic circuit 71 then shuts off the power to the motor 41. This logic circuit 71 can be located in either the PDU 29 itself or in a central system controller. This logic circuit 71 allows the operator to attempt to clear jammed cargo by reversing the drive command while preventing PDUs that have been shut off by the stall sensor from resuming operation under parked cargo. The logic circuit can, if desired, be programmed so that the motor output shaft 48 cannot resume rotation unless it is commanded to operate in the opposite drive direction first.

It should be noted that variations in the bottom surface of the cargo, which are common, cannot generate a false jam signal. This is because the sensor is not driven by the cargo, but is only stopped by the cargo.

The logic circuit 71 can be programmed to ignore delays associated with powering up the PDUs 29. A three second delay is generally sufficient to allow the series of PDUs to be elevated from their non-operational position and for the drive roller elements 45 to begin rotating. If it is desired to reverse the direction applied to the drive roller elements, then another delay, representing the amount of time needed for the drive roller elements to stop moving, for the PDU to lower and then raise, and for the PDU to start rotating in the opposite direction, is typically needed.

Figure 3B:
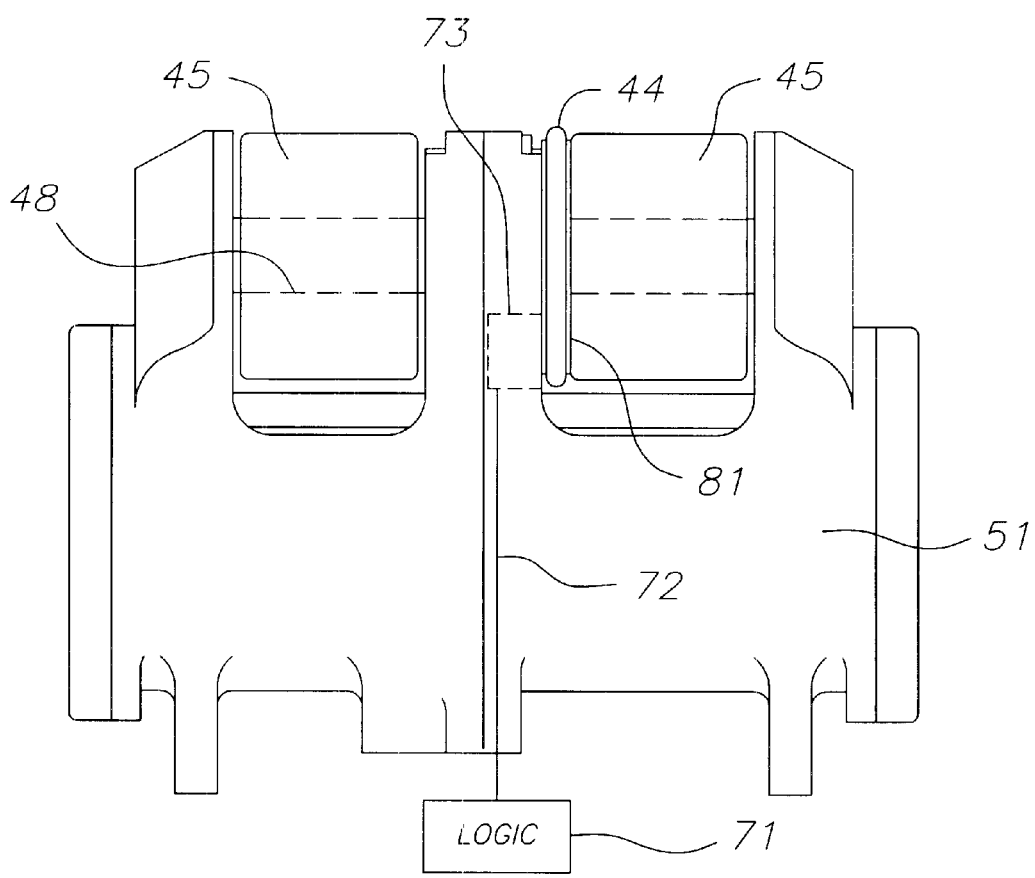
FIG. 3B is a top view of a second exemplary PDU construction according to the present invention.

An alternate PDU construction wherein the motion detector 73, reduction gears 43, cam element 47, and motor 41 are obscured by a covering 51 and the logic 71 is remotely connected is shown in FIG. 3B. It includes a stall sensor 44 coaxially mounted on an output shaft 48 (shown in broken lines in FIG. 3B) adjacent a drive roller element 45. In this alternative exemplary embodiment, the stall sensor 44 can be mounted adjacent and in frictional contact with a contact face 81 on a drive roller element 45. Preferably, the stall sensor and the drive roller element create sufficient drag for the stall sensor 44 to rotate with the drive roller element when there is no cargo on the PDU 29. Such an arrangement requires that at least one of the surfaces in contact with the cargo have a surface capable of creating the necessary friction. This configuration eliminates the need for a drag device that engages or is driven through the output shaft 48.

This particular configuration requires that the friction at the cargo surface when the stall sensor contacts the cargo be greater than the friction supplied by the stall sensor's contact with the drive roller element when jammed cargo is on the PDU. Such an arrangement would work in the same manner as illustrated in the block diagram of FIG. 5.

It will be understood by those skilled in the art that the stall sensor may be positioned in a variety of ways as long as it is rotatably coupled to the output shaft. Having the stall sensor mounted in close proximity to a drive roller element is advantageous because the drive roller elements can then best protect the stall sensor from damage by the stall cargo. It is preferred to have the diameter of the stall sensor and the drive roller elements substantially equal such that all items contacting the drive roller elements contact the stall sensor.

While a particular form of the invention has been illustrated and described, it will be apparent that various modifications can be made without departing from the spirit and scope of the invention. Accordingly, it is not intended that the invention be limited, except as by the appended claims.

I claim:

1. A cargo power drive unit comprising:
   a motor;
   an output shaft driven by said motor;
   at least one drive roller element mounted on said shaft and coupled thereto to be rotationally driven by said motor to cause movement of cargo positioned above the drive roller element;
   a rotatable sensor frictionally coupled to said shaft for rotation therewith; and
   a motion detector mounted on the power drive unit to detect the motion of said sensor.

2. The cargo power drive unit of claim 1 wherein said sensor further comprises:
   a wheel with an inner circumference and an outer circumference; and
   a drag device mounted on the inner circumference of said wheel.

3. The cargo power drive unit of claim 2 wherein said wheel includes at least one magnet rotatable around an axis of said wheel.

4. The cargo power drive unit of claim 3 wherein said motion detector is a Hall effect sensor.

5. The cargo power drive unit of claim 2 wherein the outer circumference of said wheel is lined with an elastomeric o-ring.

6. The cargo power drive unit of claim 2 wherein the outer circumferential surface of said wheel is formed by a tire.

7. The cargo power drive unit of claim 2 wherein said drag device includes an elastomeric O-ring.

8. The cargo power drive unit of claim 2 wherein said sensor is connected to said shaft by said drag device.

9. The cargo power drive unit of claim 1 further comprising a logic circuit connected to said motion detector and said motor that removes power to said motor when a signal below a predetermined level is received from said motion detector.

10. The cargo power drive unit of claim 1 wherein said sensor is mounted coaxially on said shaft with said drive roller element.

11. The cargo power drive unit of claim 10 wherein said sensor is mounted on said shaft adjacent to and in frictional contact with said drive roller element.

12. The cargo power drive unit of claim 1 wherein said sensor and said drive roller element are substantially the same diameter.

13. The cargo power drive unit of claim 1 wherein said motor is mounted on a translatable frame extendable to and retractable from a plane of cargo conveyance.

14. A system for moving cargo within an airplane hull comprising:
   propelling means for propelling cargo in and out of the airplane hull;
   detecting means frictionally driven partially by said propelling means and frictionally driven partially by the cargo for detecting when cargo positioned on said propelling means is immobile; and
   limiting means for stopping said propelling means when said detecting means indicates that cargo is immobile.

15. A cargo power drive unit comprising:
   a pivotably translatable frame;
   a motor mounted on said translatable frame;
   an output shaft driven by said motor;
   at least one drive roller mounted on said shaft and coupled thereto to be driven by said motor to cause movement of cargo positioned above the drive roller;
   a rotatable generally circular wheel frictionally coupled to said shaft by a drag device for rotation therewith;
   a plurality of equally spaced magnets positioned along an inner radius of said wheel;
   a Hall effect sensor mounted on the power drive unit to detect the motion of said magnets; and
   a logic circuit connected to said Hall effect sensor and said motor that interrupts power to said motor when a signal below a predetermined level is received from said Hall effect sensor.

16. An airplane with a cargo transportation system comprising:
   a hull with a floor;
   a series of conveyance rollers mounted on said floor; and
   a cargo power drive unit for propelling cargo within said hull on said conveyance rollers comprising:
      a pivotably translatable frame for retracting and extending said power drive unit into a plane of conveyance;
      an electric motor mounted on said translatable frame;
      an output shaft driven by said motor;
      at least one drive roller mounted on said shaft and coupled thereto to be driven by said motor to propel cargo positioned above the drive roller in the cargo plane of conveyance;
      a rotatable generally circular wheel frictionally coupled to said shaft by a drag device for rotation therewith;
      a plurality of equally spaced magnets positioned along a radius of said wheel;
      a Hall effect sensor mounted on the power drive unit to detect the motion of said wheel; and
      a logic circuit connected to said Hall effect sensor and said motor that removes power to said motor when a signal below a predetermined level is received from said Hall effect sensor.

* * * * *